United States Patent Office 3,480,515
Patented Nov. 25, 1969

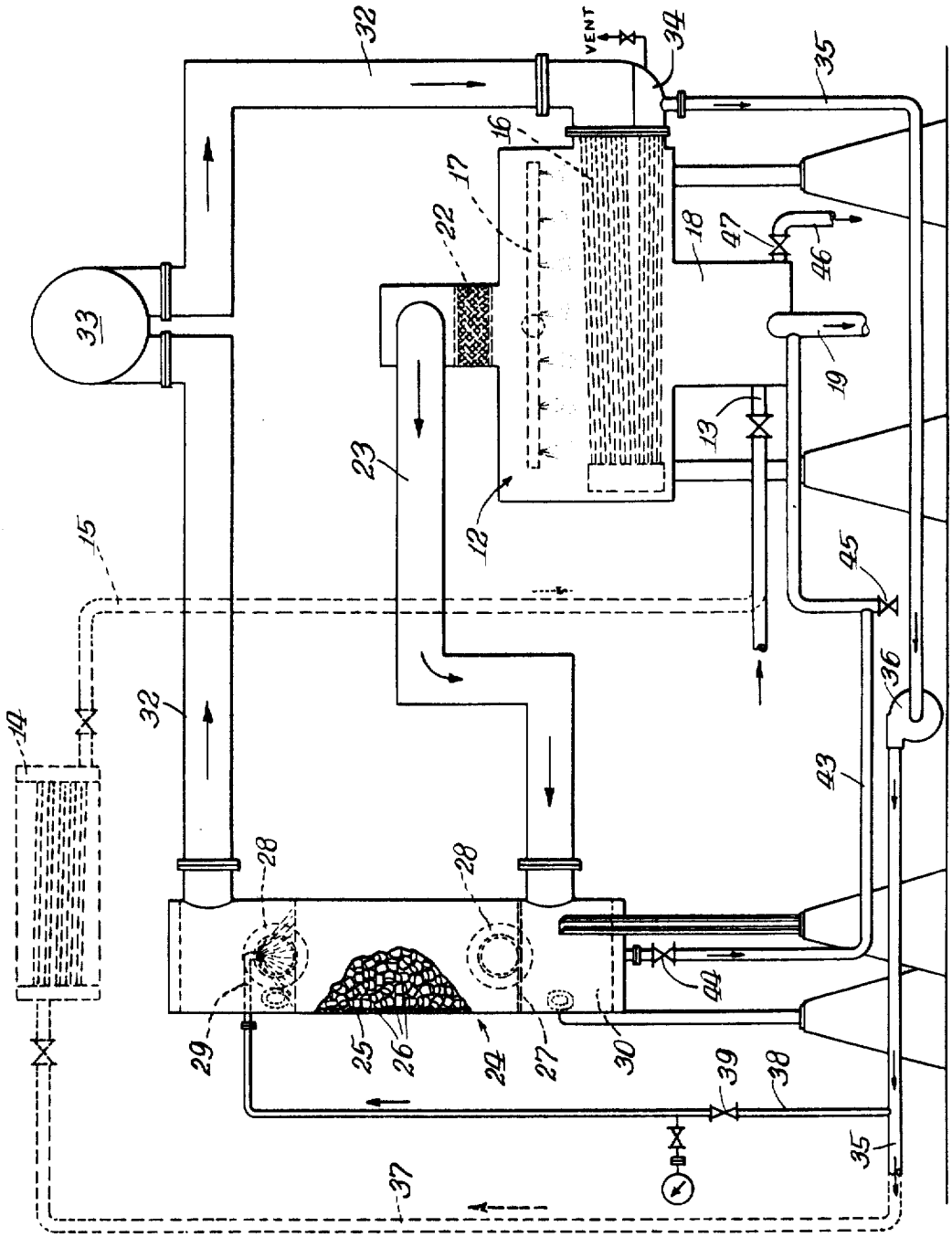

---

3,480,515
METHOD AND APPARATUS FOR VAPOR COMPRESSION DISTILLATION AND VAPOR WASHING OF IMPURE WATER
Richard W. Goeldner, Brookfield, Wis., assignor to Aqua-Chem, Inc., a corporation of Wisconsin
Filed Apr. 3, 1964, Ser. No. 357,105
Int. Cl. G21c *19/32;* C02b *1/04;* B01d *3/00*
U.S. Cl. 203—10                                    10 Claims This invention relates to the concentration of radioactive materials from a liquid such as an aqueous liquid coolant which has been exposed to nuclear radiation in a nuclear reactor. This invention also relates to the production of a product of lower radioactivity from a feed material of higher radioactivity. In addition, this invention relates to the separation from or the concentration of, boron compounds in an aqueous medium.

Numerous liquid radioactive waste streams may be produced by a nuclear reactor. It is necessary that these streams be concentrated so that the resulting concentrate may be disposed of in the normal manner of disposing of radioactive materials, e.g. mixed with concrete in drums for burial at sea or elsewhere, while the greater bulk of the material is reduced in radioactive content for disposal, e.g. through common sewers, or for reuse. One of the waste streams which may have to be handled for such concentration and/or separation is the main reactor coolant stream. Periodic withdrawal of the main reactor coolant is necessary to prevent the buildup of the concentration of corrosion products from the materials contacted by the coolant in the reactor. The coolant may be, for example, a water solution containing boric acid or salts of boric acid. The boron in the solution is used to regulate the thermal output of the reactor core. However, the boron concentration in the coolant material in use is not maintained constant over the life of the reactor fuel. Lower concentrations of boron are needed as the fuel element becomes more expended because the reaction will tolerate only a lesser amount of boron for regulation purposes. An unduly excessive amount of boron content in the coolant decreases the thermal output of the reactor to a point where it may cause the reactor to stop. For example, in one illustrative reactor, a boron concentration of 1200 parts per million may be used in the coolant under full load with a new fuel element while a boron concentration of about 10 parts per million is required under full load with the fuel element nearly exhausted. As the boron content of the coolant is increased from that required for full load, the output of the reactor diminishes correspondingly. Thus, the boron content of the coolant is an important factor in controlling the reactor output.

In the concentration of such waste streams by evaporation, and especially aqueous waste streams, it has been found that some radioactive materials are carried over with the water vapors. For example, in one system for evaporating and removing boron from a boric acid or sodium borate coolant solution, the boron appears to vaporize in some form from the boiling solution. In order to permit return of the evaporated water for reuse in the reactor cooling stream of the nearly exhausted fuel element, it is required that the boron content be well under 10 parts per million. As the coolant material evaporation is continued, the bottoms become concentrated in the boiling solution to approximately 21,000 to 22,000 parts per million boron concentration. The overhead vapor stream may contain approximately 50 to 80 parts per million boron concentration even after passage through entrainment separators which have previously demonstrated the ability to produce vapors containing less than one ten-millionth of the solids concentration of the still bottoms when operated with other salt solutions. Because of the high born content, in some manner carried over with the vapors, the vapors can not be merely condensed and returned to the reactor. Further, the radioactivity of the condensed vapors must be well below that corresponding to 10 parts per million before the condensate may be disposed of as ordinary sewage.

It is an object of this invention to provide a new and useful separation method and apparatus as described herein. A further object of this invention is to provide for the concentration of radioactive materials in a new and useful manner.

It is also an object of this invention to provide a new and useful method for concentrating boron from water solution or from water vapors.

Yet another object of this invention is to reduce the radioactive content from radioactive waste materials, especially aqueous materials containing boron.

A more particular object of this invention is the rendering of a radioactive boron solution into one portion highly concentration in boron for disposal through normal radioactive waste procedures and another portion of low boron concentration permitting it to be disposed of selectively as common sewage or reused as a coolant.

Other objects of this invention will be apparent from the following descriptions and the drawings in which the figure is a schematic diagram of an apparatus embodying the invention and illustrating the method of the invention.

While this invention is susceptible of embodiment in many different forms, there is shown in the drawing and will herein be described in detail a specific embodiment of the invention with the understanding that the present disclosure is to be considered as an exemplification of the principles of the invention and is not intended to limit the invention to the embodiment illustrated.

The present invention finds use in treatment of various vaporizable liquid streams which may be used as feeds in the present method and apparatus. The invention overcomes a separation problem which is particularly serious in the treatment of liquids which have been exposed to nuclear radiation such as in a nuclear reactor. Such liquids may include the coolant, moderator, reactor wash water, laboratory waste, etc. and mixtures of such liquids.

In accordance with the illustrative embodiment of the invention shown in the drawing, the liquid feed is delivered to the evaporation zone of an evaporator 12 via a valved inlet 13. Although the liquid feed is referred to herein as water, or an aqueous liquid, it will be apparent that other vaporizable liquids may be similarly treated in accordance with the disclosed invention.

The feed water may be delivered directly from the nuclear reactor indicated in dotted lines at 14 via conduit, or line, 15 to inlet 13. Alternatively, the liquid may be obtained from other sources, e.g. may be charged to evaporator 12 from pit storage or the like.

Evaporator 12 includes a plurality of heat exchange tubes indicated at 16 for vaporizing the feed water within the evaporator. Herein, tubes 16 are above the body of water. Hot fluid in the form of compressed vapors, is passed through the tubes 16 for supplying heat to the evaporator.

A spray system 17 is disposed for directing a spray of feed water on the vaporizing outer surfaces of tubes 16. A liquid collection space 18 is provided in the bottom of the evaporator 12 for collecting liquid falling from the tubes 16. The level of the body of liquid in the collection space 18 may be used to regulate the input through valved line 13 by a float controlling the valve of line 13, as desired.

Valved line 13 discharges the feed liquid into collection spaced 18. A recirculation pump suction line 19 and a pump (not shown) circulate the liquid from space 18 to the spray system 17 for spraying water through the rising vapors, providing cyclic flow within the evaporator. A heater may be installed in line 19 if desired for heating the recirculated liquid, although the liquid introduced through line 13, if introduced directly from a reactor, may be at an elevated temperature and it may be unnecessary to heat the fluid for bringing it to vaporization temperature other than by means of the heat exchange tubes 16 in evaporator 12.

In the top of evaporator 12 there is mounted an entrainment separation zone or layer in the form of a demister 22 for separation of entrained liquid droplets which are coalesced in the demister and returned to the evaporator. The spray of water from spray system 17 also acts to coalesce the entrained droplets in the rising vapors and cause return of the droplets to the body of water in evaporator 12. A vapor conduit 23 conducts the vapors from above demister 22 to the lower end of a packed colume 24 so that the vapors may rise through the packed column.

Column 24 has a vertical cylindrically shaped closed shell 25 and a mass of Raschig packing rings 26. Any other packing providing a large area for interfacial contact of vapor and liquid may be used in lieu of Raschig rings. The mass of rings 26 is about six feet thick and is supported in shell 25 on a perforated support plate 27 which is peripherally secured to the inner surface of shell 25 and spans shell 25 defining a manifold 30 below plate 27. The vapors from conduit 23 enter the manifold 30 and rise through the Raschig rings 26. A pair of manholes with removable covers 28 are provided for access to the interior of shell 25 for servicing, replacement of the packing, i.e. the Raschig rings, and the like.

A spray nozzle 29 is disposed above the packing 26 for directing a water spray onto the top of the packing. The water from the spray flows downward over the Raschig rings 26 into the manifold 30 where the water is collected for discharge. The water used at spray nozzle 29 should be boron-free or at least low in boron content, e.g. the water may have a boron content approximately that desired in the treated coolant product.

As the vapors rise through the packing 26, they are washed by the countercurrent flow of water downward therethrough. The vapors rise above the packing to the top of column 24 and are discharged through a recycle line 32 to a compressor 33. Compressor 33 is operated to compress the vapors and pass them into tubes 16 for use in evaporating liquid in evaporator 12 and the condensate is collected from tubes 16 in chamber 34. The condensate is the product distillate which may be discharged through line 35, e.g. by a pump as shown at 36. A vent is shown for purging noncondensibles from chamber 34.

The product in line 35 may be discharged to sewage as a liquid having a low boron content and low radioactivity or may be recycled, e.g. by a line 37 shown in dotted lines, for use as coolant or the like in the nuclear reactor 14. A portion of the distillate from line 35 is diverted through line 38 via valve 39 to nozzle 29 for supplying water spray to nozzle 29. Thus, the water sprayed from nozzle 29 is low in boron content.

The wash water collected in manifold 30 after passing downward through the column countercurrent to the rising vapors is discharged through line 43, which may be regulated by valve 44, to recirculation pump suction line 19. The wash water is then passed through the recirculating pump along with liquid being recirculated from the evaporator and is discharged onto the heating tubes 16 by the spray system 17. A valve 45 is provided for draining the evaporator and packed column or tower 24 during shut-down or the like.

A line 46, controlled by valve 47, is provided for withdrawing water concentrated in boron content from evaporator 12. The water withdrawn through line 46 is of high radioactivity and high boron content and may be disposed of in the usual manner of disposing of highly radioactive wastes. For example, the concentrated hot waste from line 46 can be mixed with concrete in drums for burial at sea or elsewhere.

In the operation of the system, feed water is delivered through valved line 13 to evaporator 12 wherein it is evaporated. The tubes 16 are heated by passage of compressed vapor therethrough from line 32 at a temperature sufficient to vaporize the water sprayed thereon from the spray system 17, e.g. 225° F., although other temperatures may be used as will be apparent. The resultant vapors pass upward through the spray from system 17 and the entrainment separator 22 for coalescing droplets of water therein. The vapor then passes through line 23 and the countercurrent water wash in column 24 to return through line 32 to the heat exchange tubes 16. Most of the vapors in line 32 are condensed and collected as distillate in chamber 34. The remainder of the vapors are vented to atmosphere along with noncondensibles. The condensate is pumped to spray nozzle 29 thereby acting as a reflux in the column 24.

As the bottoms from column 24 are recycled to the evaporator, the concentration of boron and radioactivity in the bottoms in evaporator 12 increases. The concentrated bottoms may be continuously or intermittently withdrawn through line 46 with make-up feed supplied to the evaporator through line 13. Preferably, as high a concentration of boron as will be permitted by the equipment used should be present in the bottoms prior to their withdrawal, as the cost of disposal of highly radioactive bottoms is very high and depends almost directly on the volume involved. With a little experience with the system, the capacity of the evaporator with respect to the concentration of boron in the bottoms will be readily determinable. The concentration should be kept just below that concentration at which sludge or corrosion are formed on the tubes and other vaporizing surfaces in the evaporator.

In one example of the use of the method of this invention, evaporated water having 50 to 80 parts per million boron concentration obtained from a boiling solution containing 21,000 to 22,000 parts per million boron concentration, was passed through the column 24 containing six feet in depth of Raschig rings and the condensed vapor as recovered at 34 contained only 2 to 3 parts per million boron concentration. Such low concentration is considered satisfactory for discharge directly to the local sewage system or for reuse as reactor coolant. If the boron content is too low for such coolant reuse, bottoms from line 46 may be added thereto, or boron may be added from any other suitable source to bring the coolant up to desired boron concentration.

I claim:

1. A distillation system for purifying impure water which system comprises a vapor compression still system including a shell defining an evaporation chamber, heat exchange tubes in said evaporation chamber for heating said chamber, means for distributing water to be distilled on the outer surface of said tubes, a bottom collection chamber for collecting undistilled water from said tubes, means for recirculating concentrate from said bottom collection chamber to said distributing means, and a vapor compression line receiving vapors from said evaporation chamber including a compressor for compressing the vapors and delivering the compressed vapors through said heat exchange tubes for condensing the vapors and heating said tubes, means for collecting distillate from said tubes as product, said vapor compression line including between said evaporation chamber and said compressor an upward extent defining a packed column containing packing material through which the vapors are delivered upwardly prior to compression and means for delivering wash liquid downwardly through said packed column.

2. The system of claim 1 wherein said means for delivering wash liquid through said packed column comprises means for withdrawing distillate from said distillate collection means and delivering said distillate to said packed column above said packing materials.

3. The system of claim 1 including means for directing wash liquid from the bottom of said packed column to said still system for vaporization in said evaporation chamber.

4. The system of claim 3 wherein said means for directing wash liquid to said still comprises a conduit directing the wash liquid to said concentrate recirculation line.

5. The system of claim 1 including a source of boron-containing coolant comprising a nuclear reactor including a heat exchanger for surrounding a nuclear fuel with a body of the coolant material and means for directing coolant of said body to said still.

6. The system of claim 5 including means for returning distillate from said distillate collection chamber to said heat exchange chamber.

7. A method of purifying impure water and capable of adjusting boron content in a boron-containing water coolant which comprises heating said impure water to vaporization, delivering the resulting vapors upwardly through packing in a packed column, compressing and condensing said vapors from said packed column to provide the heat for said heating step, collecting concentrate remaining from vaporization in said heating step and recirculating the collected concentrate to said heating step, collecting product distillate from said condensing step and delivering wash liquid to the top of the packed column and distributing the wash liquid on the packing for flow through the packing countercurrent to the rising vapors.

8. The method of claim 7 wherein said wash liquid comprises a portion of the collected product distillate.

9. The method of claim 8 including the step of recovering and directing wash liquid from the bottom of the packed column to said heating step for vaporization thereof.

10. The method of claim 9 wherein said wash liquid directing step comprises directing the wash liquid to said recirculating step.

References Cited

UNITED STATES PATENTS

| | | | |
|---|---|---|---|
| 2,509,136 | 5/1950 | Cornell | 203—26 |
| 2,863,808 | 12/1958 | Markels | 202—158 |
| 3,163,685 | 12/1964 | Gaede | 202—158 |

WILBUR L. BASCOMB, Jr, Primary Examiner

U.S. Cl. X.R.

176—37, 39; 202—183, 197, 200, 235, 236; 203—26, 40, 41, 42, 90, 98